United States Patent [19]

Hamilton et al.

[11] Patent Number: 4,677,263

[45] Date of Patent: Jun. 30, 1987

[54] AIR SPRING POSITION SWITCH

[75] Inventors: James M. Hamilton, El Cajon; Bruce Burness, Pasadena, both of Calif.

[73] Assignee: C&K Venture Income I-Coast, Santa Monica, Calif.

[21] Appl. No.: 756,819

[22] Filed: Jul. 18, 1985

[51] Int. Cl.[4] ............................................. H01H 15/14
[52] U.S. Cl. ................................. 200/61.44; 200/276; 280/DIG. 1; 340/605
[58] Field of Search ................ 280/DIG. 1, 6 R, 6 H; 180/41; 200/61.23, 61.44, 52 R, 276, 81 R, 81 H, 81.4, 81.5, 275, 83, 2, 83 N, 83 C; 340/605, 626, 53; 73/714, 723

[56] References Cited

U.S. PATENT DOCUMENTS

| | | | |
|---|---|---|---|
| 3,379,851 | 4/1968 | Weremey | 200/276 |
| 3,394,345 | 7/1968 | Thomas | 340/605 |
| 3,944,769 | 3/1976 | Wagner | 340/605 |
| 4,007,343 | 2/1977 | Alten | 200/81 R |
| 4,211,935 | 7/1980 | Erben | 200/81.4 |
| 4,398,704 | 8/1983 | Buchanan, Jr. | 280/DIG. 1 |

*Primary Examiner*—G. P. Tolin
*Attorney, Agent, or Firm*—Christie, Parker & Hale

[57] ABSTRACT

A position switch is set forth which is adapted to generate a signal whenever two masses, such as a vehicle sprung and unsprung mass, are at or nearer than a desired spacing. The switch includes a grounded, conical, coiled spring attached to one mass, and an electrically charged plate secured to the other mass. The spring has a relaxed length to lie adjacent the plate when the masses are at the desired spacing. When the masses are brought together the spring contacts the plate, is compressed, and the plate is grounded generating a current signal indicating that the masses are at or nearer than the desired spacing.

6 Claims, 15 Drawing Figures

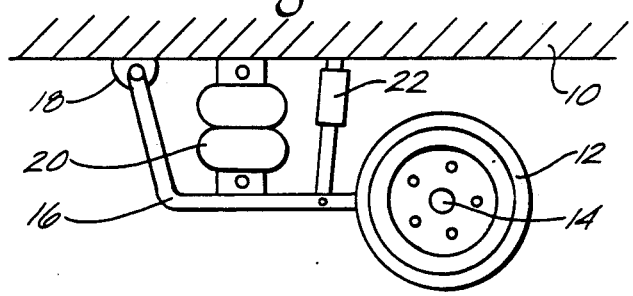
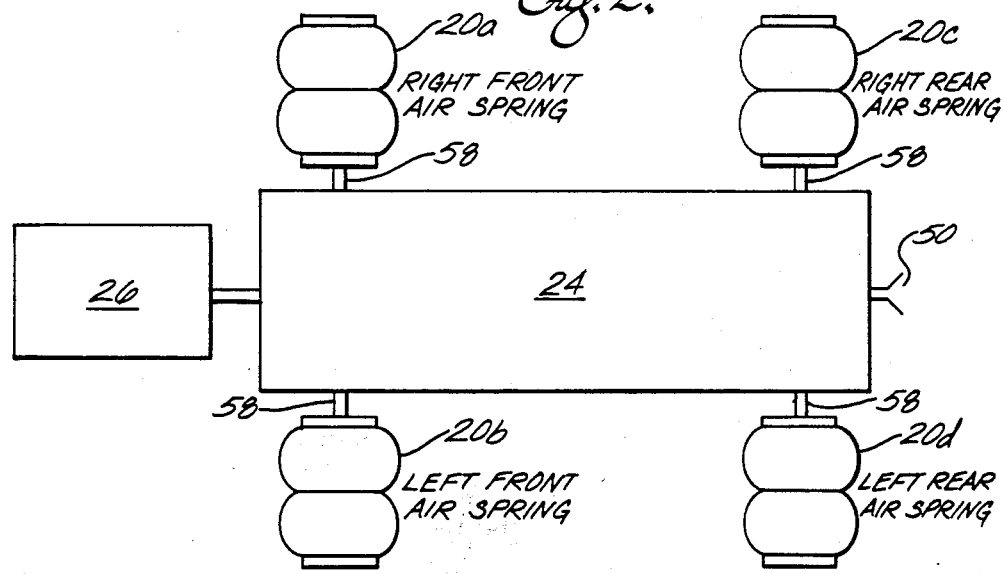
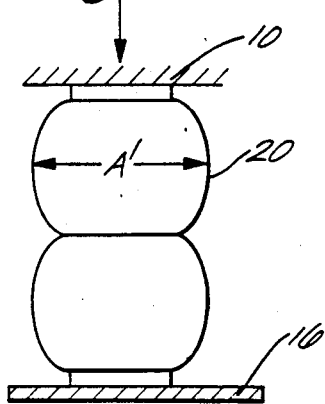
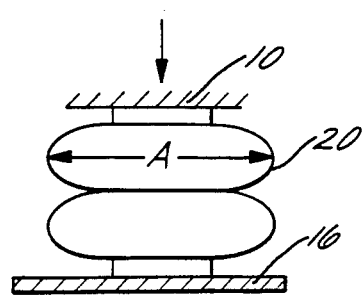

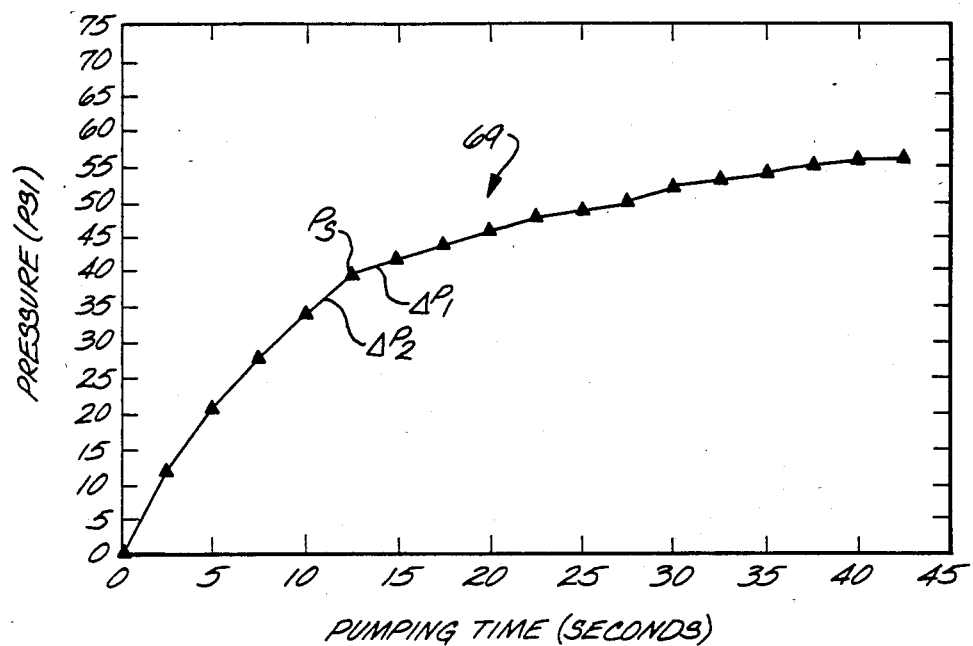
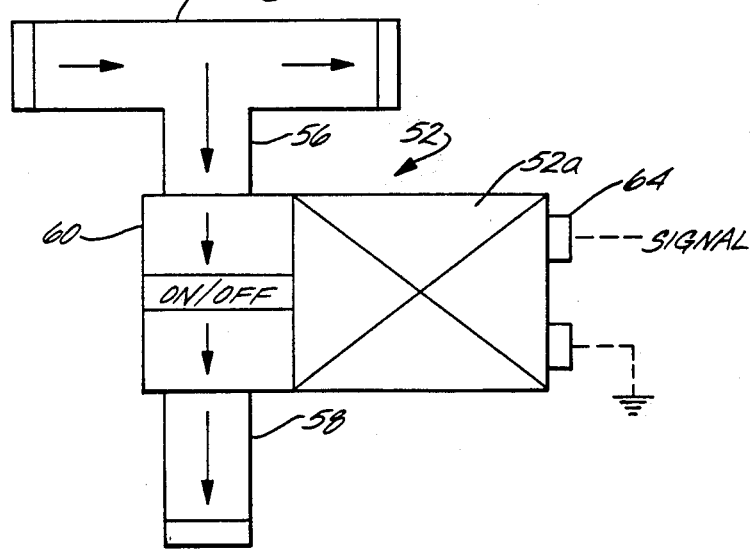

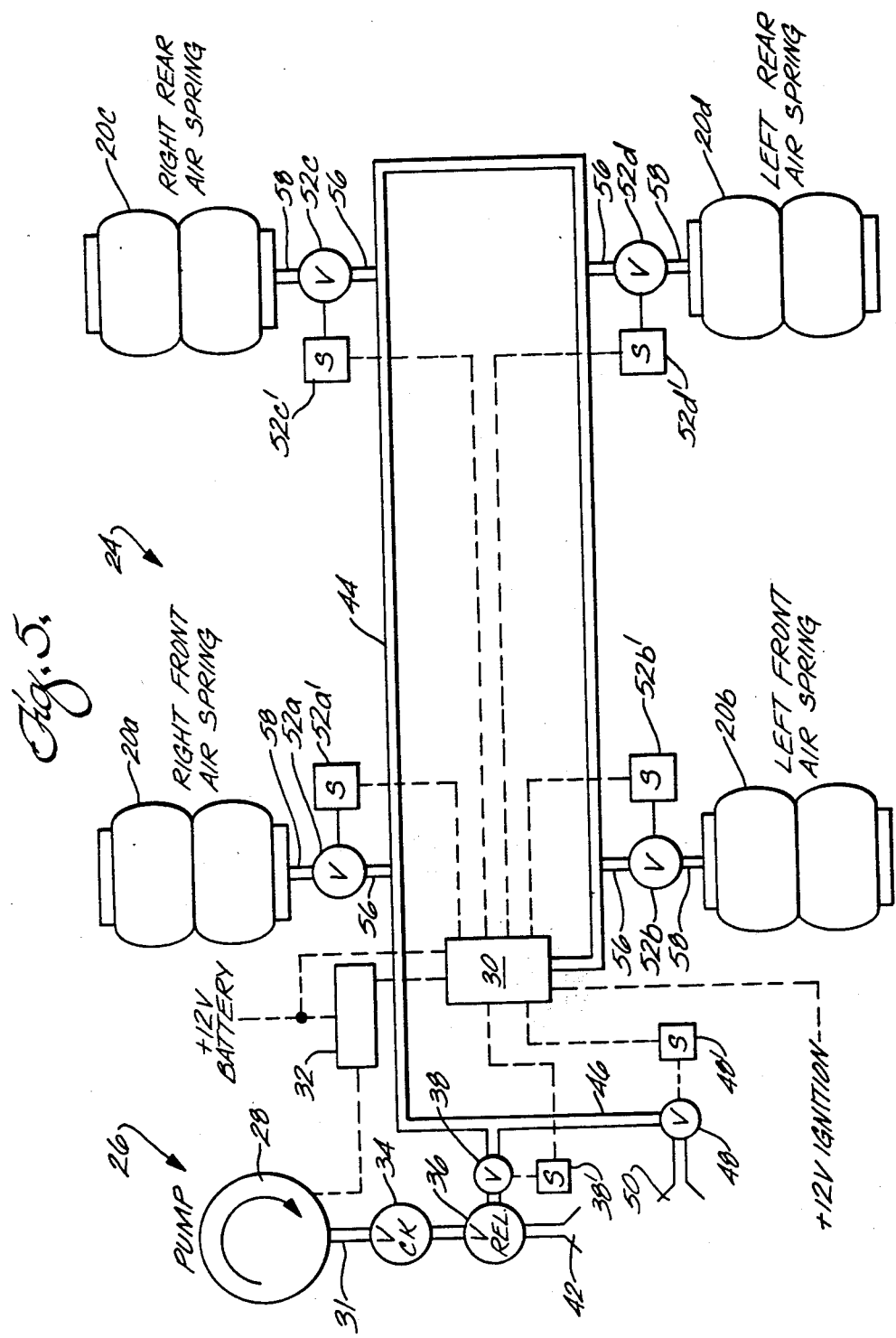

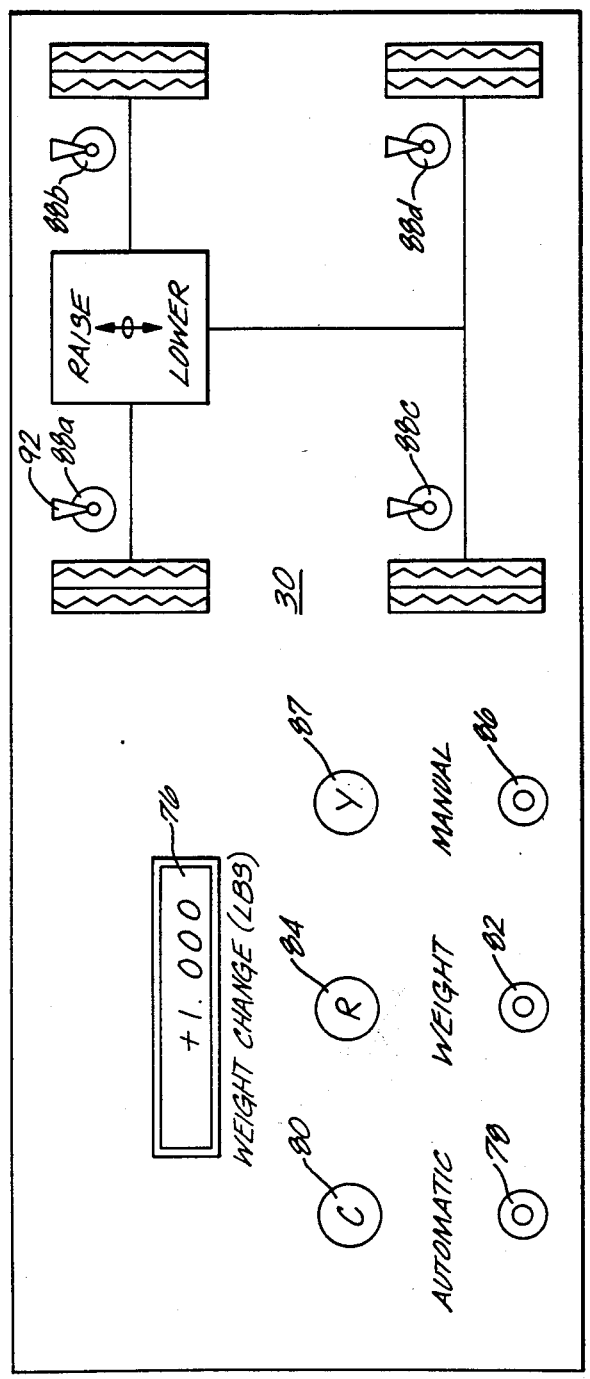

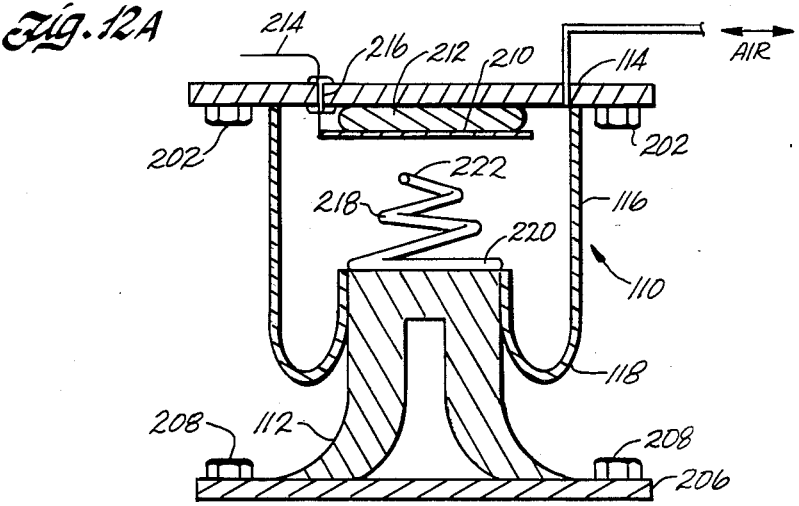
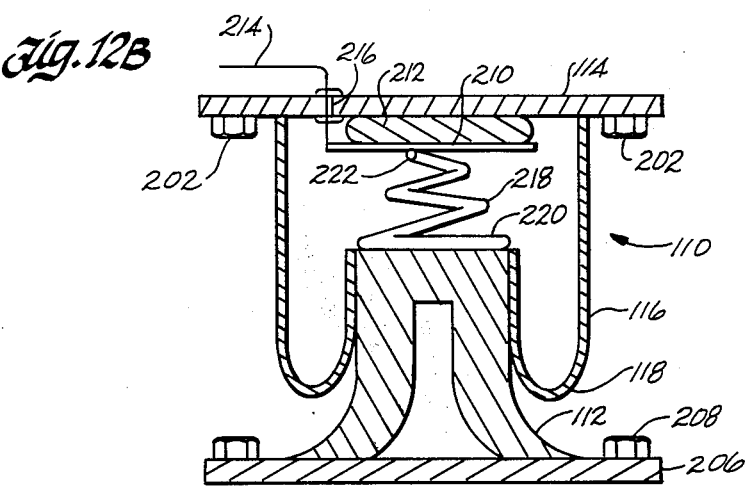
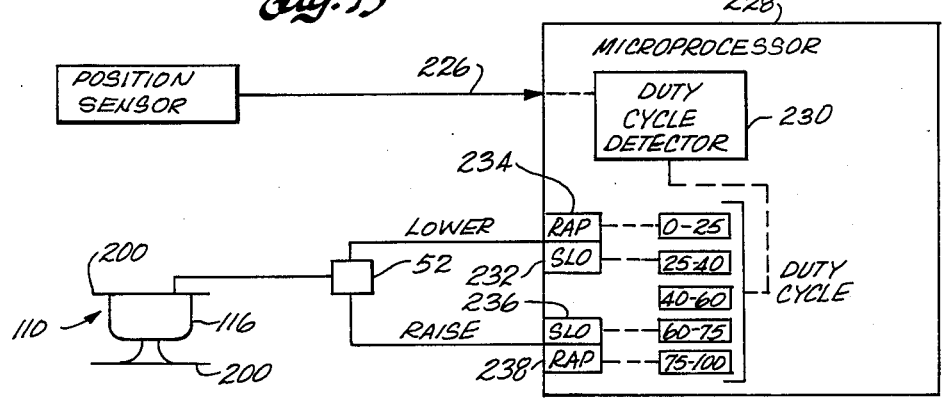

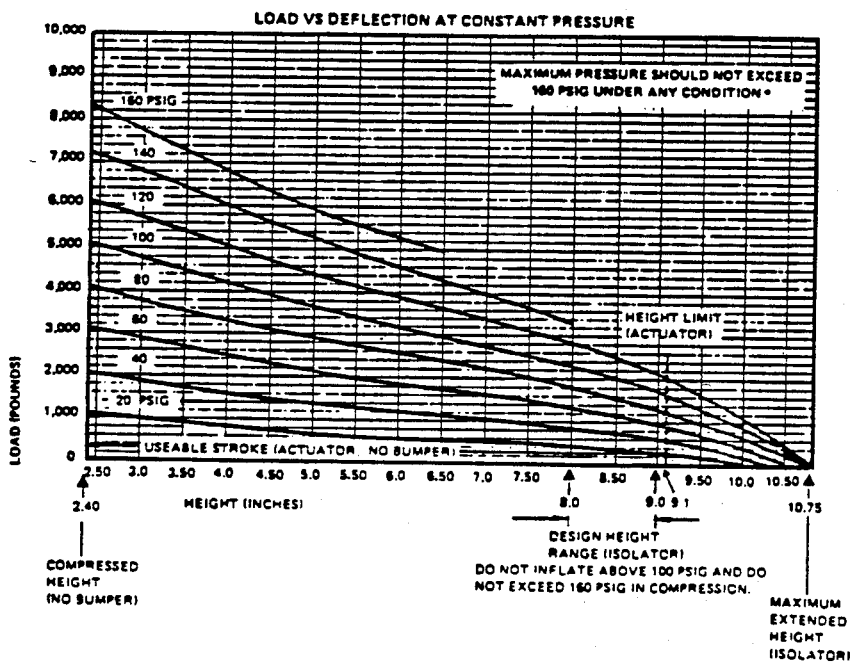
Fig. 14 TABLE I
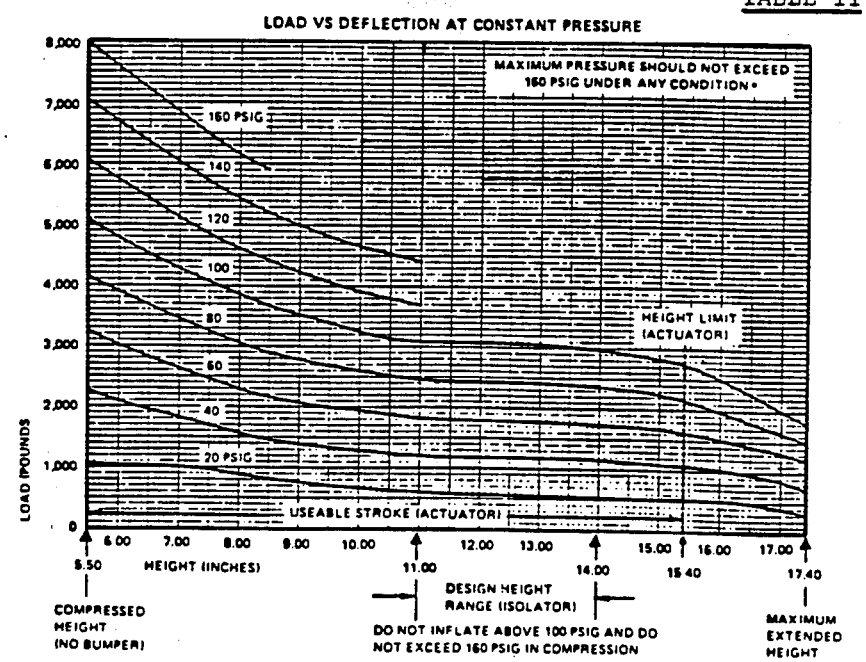
Fig. 15 TABLE II — AIR ACTUATORS/AIR ISOLATORS

AIR SPRING POSITION SWITCH

FIELD OF THE INVENTION

This invention relates to position switches and more particularly to position switches for air springs for leveling vehicles.

BACKGROUND OF THE INVENTION

Position sensors have been used in many applications where it is desired to obtain information concerning the position of one object relative to another object or to some absolute reference such as the ground. One example of use of a position sensor is for leveling of a vehicle using air springs. The air springs are disposed between the wheel's axle or axle support (the unsprung mass) and the chassis (the sprung mass). When deflated, the chassis is lowered to rest upon the axle or support, the chassis being supported by, for example, rubber stops or the like. When inflated, the chassis is raised relative to the axle or support by the springs to the desired height. Shock absorbers are also typically provided between the chassis and the wheel axles or supports to dampen relative motion between the chassis and axles.

To raise the chassis, the air spring or springs are inflated, usually manually or, recently, by suitable controls. The pressure of the compressed air within the spring rises resulting in a corresponding lifting of the chassis by the air springs.

When the vehicle cargo changes or shifts, an indication of a non-level condition must be obtained. For manual systems a visual examination of the chassis' position is used. For automatic leveling systems, position transducers or proximity-type sensors are commonly used. These sensors provide an indication typically of a level condition, a low condition and a high condition by generating signals particular to each of the aforesaid conditions. The sensors may also be constructed to provide signals of a low-low and a high-high condition.

A drawback of the position sensors according to the prior art is that they are relatively expensive and complicated and are subject to wear and failure. Further, the sensors are in most instances disposed at the underside of the vehicle and are therefore exposed to dirt, grime, water and ice which also lead to failure of the sensors.

SUMMARY OF THE INVENTION

There is, therefore, provided in the practice of the present invention a position switch which is simple, inexpensive and reliable and which, in cooperation with an appropriate control system, provides the position information necessary for leveling of a vehicle.

Toward this end, the position switch is adapted to generate a signal when one mass, such as a vehicle chassis, is at or nearer than a preselected position relative to another mass such as the vehicle axle. The switch includes a conductive collapsible member preferably embodied as a coiled spring. The spring is secured at one end to one mass and is selected to have a relaxed (non-compressed) length such that it first makes contact with the other mass when the masses are at the desired relative position. At the one mass the member is grounded. Means are provided for imposing an electrical potential at the other mass. For vehicles, a 12-volt potential is applied from the vehicle's electrical system.

Whenever the vehicle is loaded or operated such that the masses are brought together and the member contacts the other mass, the potential is grounded through the member. Grounding of the potential generates a current signal indicating that the masses are at or nearer than the predetermined, desired spacing. The signal is processed to determine the required load leveling response.

More particularly, for vehicles, the chassis is supported on the vehicle axles by a suspension system including shock absorbers and inflatable/deflatable air springs. Each air spring includes an inflatable portion which, when inflated, expands to raise the chassis and when deflated retracts to lower the chassis. The inflatable portion is secured between a pedestal affixed to, for example, the axle and a cap connected to the chassis. Mounted on the pedestal and housed within the portion to be protected from the environment is the member preferably embodied as coil spring. The coil spring is conductive having one end coupled to the pedestal and grounded through the axle and wheels. Preferably, the coil spring is conical having a base coil secured to the pedestal and a smaller diameter end coil. The cap includes, within the inflatable portion, a conductive plate positioned to contact the coil spring when the axle and chassis are brought together. In its relaxed, i.e., non-compressed, state the spring has a length such that the end coil first contacts or is closely adjacent the plate when the chassis and axle are at the desired relative position representing a level condition for the vehicle. When the chassis and axle are brought together the plate engages and compresses the spring.

To generate a signal when the chassis and axle are nearer than the predetermined, level condition, an electrical potential is imposed at the plate from the vehicle's electrical system. When the plate contacts the spring the potential is grounded through the spring generating a current signal.

Automatic vehicle leveling control means process the signal by, for example, determining the combined duration of the generated signal over a time interval to establish a duty cycle for the switch and the associated air spring. If the determined or detected duty cycle is less than the desired duty cycle, this indicates that the vehicle is too high, and accordingly means are provided to incrementally deflate the member and incrementally lower the vehicle at that air spring. If the determined duty cycle is greater than the desired duty cycle, this indicates that the vehicle is too low. Accordingly, the member is incrementally inflated to incrementally raise the vehicle. Over a period of a lapsed time, the determined duty cycle for all members achieve substantially the desired duty cycle thereby leveling the vehicle.

In addition to providing for leveling of the vehicle the spring provides a reference such that the weight borne by each spring and the entire weight or weight change of the vehicle may be calculated.

BRIEF DESCRIPTION OF THE DRAWINGS

These and other features and advantages of the present invention will become appreciated as the same become better understood with reference to the specification drawings and claims wherein:

FIG. 1 is a schematic view of a suspension system for one wheel of a vehicle;

FIG. 2 is a schematic view of the air springs for all four wheels of a vehicle and the control system therefor;

FIGS. 3A and 3B illustrate the change in cross sectional area of a typical bellows-type spring;

FIG. 4 shows a time-pressure history for a typical bellows-type spring during inflation and which indicates the transfer of a load to the spring;

FIG. 5 is a schematic view of the control system for the air springs;

FIG. 6 shows a typical air solenoid used for each air spring of FIG. 5;

FIG. 7 illustrates an exemplary control panel for the air spring control system adapted to be disposed at the vehicle dash;

FIG. 12A is a side section view for a position switch according to the present invention for dynamic leveling of the vehicle in a position where no signal is generated;

FIG. 12B is a view similar to that of FIG. 12A showing the switch generating a signal;

FIG. 13 diagrammatically illustrates a control for dynamic leveling;

FIG. 14 is a table showing load versus deflection at constant pressure for a bellows-type air spring; and FIG. 15 is a table showing load versus deflection at constant pressure for a rolling-lobe type air spring.

DETAILED DESCRIPTION

Figure 8:
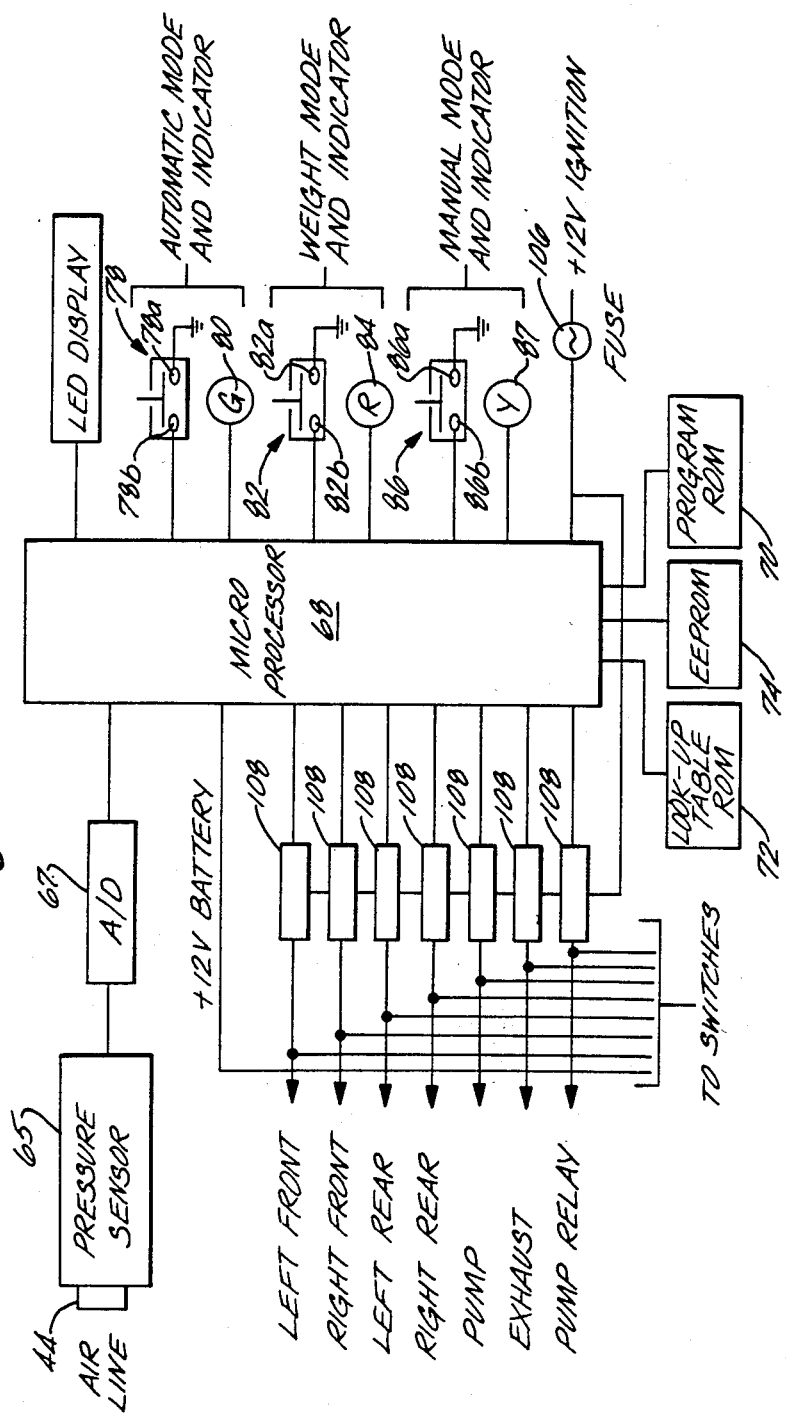
FIG. 8 diagramatically illustrates a data processing device and its various inputs and outputs providing the control function for the system.

By way of background, a system will first be described which does not require position sensors or switches.

In FIG. 1 a pair of masses are shown represented by a sprung mass which may be a vehicle chassis 10 and an unsprung mass shown as wheel 12. The wheel 12 is mounted to an axle 14 supported relative to the chassis 10 by an axle support represented by a mounting arm 16. The arm is pivotally connected at a connection 18 to the chassis 10. It is to be understood that all of the axles of the vehicle are supported by suitable means for relative movement between the axle and the chassis 10.

Each of the vehicle's axles or mounting arms is supported relative to the chassis by an inflatable member which may be embodied as a bellows-type air spring 20. The air spring 20, described below, is inflatable between a deflated state where the axle is located closest to the chassis and the chassis is at its lowermost position relative to the ground (datum) and a fully inflated state wherein the chassis 10 is lifted relative to the axle and the ground. When deflated, suitable rubber stops (not shown) are provided so that the chassis comes to rest upon the mounting arm 16 or axle 14. Inflation of the air spring 20 causes it to lengthen and lift and support the chassis 10 relative to the axle 14.

Acting in conjunction with the air spring 20, the vehicle also includes a shock absorber 22 which may be of conventional design. The shock absorber 22 and air spring 20 are typically referred to as the vehicle suspension system.

Turning to FIG. 2, an arrangement of air springs 20 for a vehicle is shown. The vehicle includes right front, left front, right rear, and left rear air springs 20$a$–$d$, each of the air springs supporting the chassis 10 above the corresponding axle. FIG. 2 also schematically illustrates a control system 24 for controlling the inflation and deflation of the individual air springs for raising and lowering of the chassis 10 for leveling of the vehicle. To provide a source of pressurized gas for inflating the air springs, a pressurized air source 26 is shown as communicating through the control system 24 to the individual air springs 20. Also an exhaust 50 is provided.

The bellows-type air springs 20, as illustrated in FIGS. 1 and 2, are generally known in the prior art. One manufacturer of the air springs is The Goodyear Tire and Rubber Co. of Akron, Ohio. A characteristic of such air springs, is that during inflation thereof they lengthen from a deflated state, as shown in FIG. 3A to an inflated state as shown in FIG. 3B. The lengthening of the spring urges the masses, for example, the chassis 10 and axle 14 to separate thereby raising the chassis 10 relative to the axle and to the ground or other datum. A characteristic specific to bellows-type air springs is that during inflation the cross sectional area acted upon by the pressure within the spring to lift the chassis decreases as the spring lengthens.

In the deflated state (FIG. 3A) the cross-sectional area acted upon by the pressure in the spring is illustrated as A.

When the spring is inflated, the cross-sectional area acted upon by the pressure within the spring to lift and support the chassis is represented by area A'. As shown, the cross sectional area reduces as the spring lengthens. The relationship between the cross-sectional area of the spring 20 and its length is well known. That is, if the length of the spring is known so then is the cross sectional area.

Further, from the relationship that $F = P \times A$ where F is the force necessary to separate the masses, i.e. lift the chassis, P is the pressure of the gas in the spring and A is the equivalent cross-sectional area (the area against which the pressure acts) once the length of the spring is known so is the force and vice versa. Table I, shown in FIG. 14, illustrates the relationship between the length or height of the spring and the force or load which it can support. This Table is for a Goodyear air spring part No. 23B-150.

From this Table, it can be appreciated that for a given load, if pressure is known, then the height is also known and vice versa. Further, if the weight is known, the spring can be extended to its desired height to raise the chassis by simply introducing the correct corresponding pressure into the spring.

Accordingly, it is advantageous to initially determine the weight of the chassis 10 imposed upon each individual air spring 20$a$–$d$. The determined weight not only provides the information helpful in leveling the vehicle as discussed below, but can also be of use in determining the weight of the cargo carried by the vehicle.

To determine the weight of the vehicle and to control the overall inflation and deflation of the air springs 20$a$–$d$, to level the chassis, the control system 24, as illustrated in FIG. 5, and compressed air source 26 are provided. The compressed air source includes an air pump 28. To power the pump 28, the 12-volt electrical system of the vehicle is supplied to the pump 28 via a dash mounted control panel 30 and a control relay 32. When powered, the pump 28 supplies compressed air at, preferably, a constant flow rate to a supply conduit 31, through a check valve 34 and to a tee 33 and to a supply control valve 38 operated via a solenoid. When the pump 28 is initially energized, the supply control valve 38 is closed. The check valve 34 aids in the start up of the pump 28. A relief valve 36 is adapted to open and relieve compressed air through a vent 42 to maintain the proper pressure within the supply conduit 31. If desired, an accumulator could be added to the source 26. The source 26 and air control system may also include filters, dryers and the like to condition the air.

To supply the air compressed by the pump 28 to the air springs 20a-d, a supply header 44 extends from the supply control valve 38 around the vehicle to service all the air springs. Alternatively, a manifold with individual lines could be routed to each air spring. The header 44 terminates at the panel 30 where the pressure of the gas within the header 44 is sensed to control the operation of the system as set forth below. To provide for venting of the air springs 20a-d, the header 44 communicates with a solenoid operated relief valve 48. For the solenoid valves described above, and hereinafter, the solenoid actuators will be designated with the valves reference numeral followed by a prime (').

To determine the weight and loading of the chassis, the control system initiates a calibration cycle described hereinafter with reference to a single air spring 20a. The same cycle is repeated for each of the air springs to determine the weight of the chassis at each air spring and thereby its distribution and overall weight.

To obtain proper leveling of the chassis, the calibration cycle should be run while the vehicle is stationary and resting on a relatively flat, horizontal surface.

During the calibration cycle the relay 32 is activated turning the pump 28 on by an appropriate switch at the panel 30 or alternately by the system control. When energized, the pump 28 supplies compressed air through the check valve 34 to the supply control valve 38. To calibrate the right front air spring 20a, the relief valve solenoid 48' is actuated to open the relief valve 48 and vent the header 44 through its suitable vent 50. Next, the control system opens solenoid operated valves 52a-d disposed in conduits which provide communication between the springs and the header 44 such that the compressed air within the springs is vented through the supply header 44, relief valve 48 and vented through vent 50.

The solenoid operated valves 52a-d for each air spring may be of any suitable construction. FIG. 6 shows an exemplary construction of such a valve 52. The valve 52 includes a T-connection 54 which is connected into the header 44, the T-connection having a branch 56 which is connected to the valve 52. From the valve 52 a connection 58 is connected to the air spring to supply compressed air thereto or vent air therefrom.

The valve 52 includes an actuator 60 movable by the solenoid 52' between a closed position wherein communication between the branch 56 and stub 58 is blocked to an open position where communication between the header 44 and air spring through the branch and stub is provided. The solenoid 52' is adapted to hold the actuator 60 in a closed position when deenergized and, when the solenoid 52' is energized via a signal provided to one of the contacts 62 of a solenoid 52, to open the actuator and provide for the aforesaid communication. A second contact 64 for the solenoid 52' is grounded as is well known in the art.

Gradually, during the initial portion of the calibration cycle, the chassis is lowered as the springs deflate until for example it ultimately rests upon stops provided between the chassis and the axle or support arm. Thereafter, the solenoids 52a'-d' are deenergized closing the valves 52a-d and preventing communication between the air springs and the header 44. The relief valve 48 is also closed by deenergizing the solenoid 48' to prevent further venting of the header 44.

The pressure in the header 44 is monitored by a pressure sensor 65 (FIG. 8) which may be disposed at the panel 30 or at any other location.

The control system energizes the solenoid 52a' to open the actuator 60 of the valve so that the header 44 and pressure sensor 65 see the pressure of the air spring 20a. At this point, the solenoid 38' is energized to supply compressed air, at a substantially constant flow rate to the air spring 20a to begin inflating it. To provide the constant inflation rate the solenoid 52a' could be energized and deenergized in a pulsed fashion or a suitable orifice or orifices could be provided.

The pressure sensor (FIG. 8) senses the pressure of the header and thereby of the air spring 20a, in incremental time intervals such as once every five seconds or so. The sensed pressure is converted from an analog signal to a digital signal by a converter 67 the signal being provided to a microprocessor 68. The microprocessor 68 based upon the sensed pressure over a period of time, develops a pressure-time history 69 which may be assembled and stored by any suitable means. The assembled and stored pressure-time history 69 of the inflation of the air spring 20a is graphically illustrated in FIG. 4. One method to develop such a history is for the processor to compare the sensed pressure with the pressure sensed at the previous time interval and determines a differential pressure $\Delta P_1$. If the calibration cycle has been operating for a sufficient length of time, the control system compares $\Delta P_1$ with the differential pressure, $\Delta P_2$ represented as the difference between the pressure sensed at the preceding time interval and the pressure sensed at the second preceding time interval. As the pressure-time history is developed for each new sensed pressure, the control system redetermines $\Delta P_1$ and $\Delta P_2$ and compares them. Further as each sensing and determination step proceeds, the previously determined $\Delta P_2$'s are processed to give an average $P_2$ represented as $\Delta P_2$ Ave. Each time a new $\Delta P$ is determined, it is compared with $\Delta P_2$ Ave.

As graphically illustrated in FIG. 4, at some particular time during the inflation of the air spring 20a the masses, i.e., chassis and axle or support arm will begin to separate whereupon the volume within the spring begins to increase. Because of this increased volume the determined $\Delta P_1$ will show a decrease with respect to the calculated $\Delta P_2$ Ave. Graphically, this is illustrated by the history 69 of the graph on FIG. 4. When this event occurs, the control system recalls the pressure sensed at the preceding time interval represented by $P_s$ for processing to determine the weight of the vehicle on the spring.

Turning to FIG. 8, the pressure sensor 65 and microprocessor shown as 68 are schematically illustrated. The microprocessor 68 is controlled by a program ROM 70 which provides software to control the microprocessor in the manner described above and hereinafter. The control system may also include a second ROM 72 which has been previously encoded with data providing a concordance between pressure within the air spring, height (i.e., length of the air spring) and load. The data encoded on the second ROM 72 is specific to the characteristics of the air spring used on the vehicle.

The concordance or lookup table between pressure, height and load encoded into the second ROM 72 is the data represented, for example, in Table I. Accordingly, at pressure $P_s$ as determined by the microprocessor, the processor would examine the data encoded in the second ROM 72 (i.e., the data from Table I) using the pressure $P_s$ and the height of the spring shown as 2.50 inches (i.e., when the chassis begins to be lifted) and examines the lookup table in the second ROM 72 to determine a corresponding load or weight. For example, given the pressure-time history of FIG. 4 and the pressure $P_s$ as being about 40 lbs./square inch, the processor via the lookup table in the second ROM 72 would retrieve from the table a load of about 2,000 lbs. This load would be displayed and could be encoded into a non-volatile EEPROM 74 so that in the event of a power failure the load as determined and during the calibration cycle would be retained. If desired, the load determined from the calibration cycle could be compared with a load previously encoded into EEPROM 74 to determine and, if desired, display the change in load.

After the load upon the air spring 20a has been determined through the calibration cycle, solenoid 52a' is deenergized (closed) and the calibration cycle is repeated anew for each of the air springs 20b–d.

After the loads have been calculated at each air spring, the control system is operated to supply compressed air to each spring 20a–d to raise it to any desired height, the processor comparing the load determined from the calibration cycle and desired height to the lookup table to find a concordance and retrieving the required pressure to raise the chassis to the desired height. This procedure is followed for each air spring 20a–d until the vehicle is leveled at the desired height.

As can be appreciated, the control system and air springs do not require position sensors in that, via the calibration cycle and from the known characteristics of the air springs, height can be determined by pressure. Further, the control system is well suited to calculate the overall weight of the chassis or weight changes as desired, and the weight at each air spring. Further, by encoding the characteristics of the vehicle such as the distances from longitudinal, latitudinal center axes of the vehicle to each air spring into the second ROM 72, the load calculated at each air spring can be used to determine the center of gravity of the vehicle.

Figure 9:
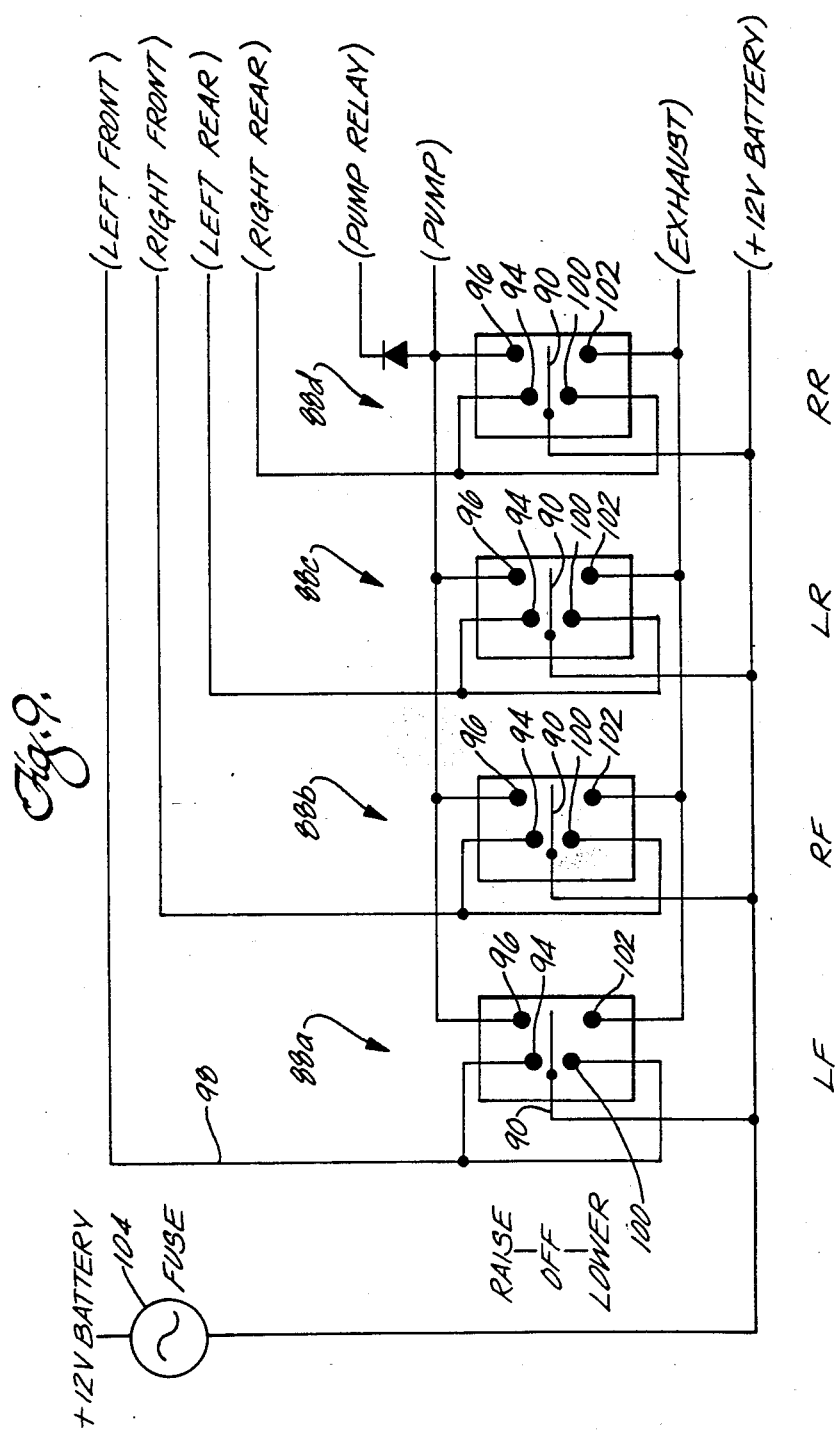
FIG. 9 is an electrical schematic for the dash board switches of the control panel of FIG. 7.

Turning to FIGS. 7 and 9, the control panel 30 is shown. The control panel 30 is preferably disposed at the vehicle dash and includes an LED type display 76 which interfaces with the microprocessor 68 to give a visual, numerical readout of the weight at each air spring and, if desired, the gross weight of the vehicle. Alternatively, by using the EEPROM 74 the microprocessor may be adapted to provide an indicational weight change from a previous calibration cycle to the driver which may be useful particularly to determine the weight of cargo added or removed from the vehicle.

As discussed below, the control system may be adapted to receive input from position sensors at each or several of the air springs. The position sensors provide the reference points, i.e., spring height, which is necessary to determine the load on each spring.

Disposed on the display panel 30 are three push button type switches each having associated therewith an indicator light. One of the switches, identified as automatic switch 78 when depressed closes its contacts 78a and 78b (FIG. 8) signaling the microprocessor 68 that the automatic mode has been selected. Once the vehicle has been leveled, according to the above and the automatic mode is selected, the control system monitors the pressure on each spring maintaining a constant pressure therein and therefore the correct, load leveling height. Temperature changes and leaks, or the like, may cause pressure changes which must be compensated for by opening and closing the correct valves. When the automatic switch 78 is closed, the microprocessor 68 automatically controls the pressure in each spring and, to give an indication of the automatic mode, causes a green indicator light 80 to be lit.

To initiate the calibration cycle and to give the gross weight or weight change of the vehicle the control panel 30 includes a push button switch shown as weight switch 82, the pushing of which closes contacts 82a and 82b, signaling the microprocessor 68 to initiate the calibration cycle. Typically, when the vehicle parks on a flat surface and the weighing and load leveling is desired, the weight switch 82 is depressed initiating a calibration cycle described above.

The microprocessor during the calibration cycle causes a red light 84 to flash telling the operator that the cycle is ongoing. During the cycle, the weight change can be displayed as the data is received at the display 76.

When the vehicle is parked on an inclined surface or when manual control of each air spring is desired, the control panel includes a push button manual switch 86 which when pushed closes contacts 86a and 86b signaling the processor that the operator has taken over the manual control of the air springs. Closure of the manual switch 86 causes a yellow light 87 to be lit indicating that the operator now has complete control.

To manually control each individual air spring, the control panel 30 includes four 3-position, return-to-center type switches 88a–d each associated with a corresponding air spring 20a–d. The operation of the switches is schematically shown in FIG. 9 in conjunction with FIG. 5. In that the switches are similar in structure and operation, only switch 88a associated with the left front air spring 20a will be described in detail.

Should, for any reason, the operator desired to raise or lower the air spring 20a the manual switch 86 is depressed signaling the microprocessor that the manual mode has been selected. In any mode, the operator has complete control over each individual air spring to raise or lower the chassis 10 at that air spring. In the manual mode, the microprocessor is passive but stores the desired pressures of the air springs.

The switch 88a has a lever 90 (FIG. 9) which is connected to the 12 volt electrical system of the vehicle such as the 12 volt battery. The lever 90 is actuated by movement of a suitable handle 92 at the control panel 30. To raise the chassis 10 at the left front air spring, the handle and lever is moved upwardly at the control panel causing the lever 90 to simultaneously engage and supply power to contacts 94 and 96.

The supply of power to the contact 94 is transmitted through an appropriate wire 98 to energize solenoid $52a \propto$ and provide communication between the header 44 and the air spring 20a. The supply of 12 volt power to the contact 96 triggers the pump relay 32 to supply power to the pump 28 and also energizes the solenoid 38' to provide the compressed air to the header 44 and to the air spring 20a to pump up the air spring (i.e., raise the chassis 10). Release of the handle 92, by appropriate spring action in the switch 88a, returns the lever 90 to its intermediate position as shown in FIG. 9. wherein the solenoids are deenergized and the valves are closed.

When it is desired to lower the chassis 10 at the air spring 20a, the lever 90 is moved downwardly to make contact with contacts 100 and 102. The contact between lever 90 and the contact 100 supplies the 12 volt power to the solenoid 52a' to energize solenoid and open the valve 52a to provide communication between the header 44 and the left front air spring 20a. Simultaneously, the lever 90 supplies the 12 volt power to the contact 102 which energizes the solenoid 48' to exhaust air from the air spring 20a to the header 44 and relief valve 48. In this manner, the chassis 10 can be lowered at the left front air spring. To protect the various switches and solenoids, a fuse 104 may be provided.

As can be appreciated, each of the switches 88a–d operate in the identical fashion to raise or lower each of the air springs 20a–d as desired by the operator.

Turning to FIG. 8, the interface between the switches at the control panel 30 and the microprocessor 68 is schematically illustrated. As shown, the microprocessor powered by the 12 volt battery, receives inputs from the pressure sensor 65 and the various switches 78, 82, and 86 and from the first and second ROMS 70 and 72 and the EEPROM 74. In the automatic or weigh mode, the microprocessor examines the information received from the pressure sensor 65 and from time to time closes one or more switches in such a manner as to energize or deenergize the various solenoids and relay to supply compressed air to or vent air from each of the air springs 20a–d. Between each of the solenoids and relay are switches 108. Each of the switches 108 receives power from the 12 volt ignition system to, when actuated by the microprocessor 68, supply power to the various solenoids and relay. This power is protected by fuse 106. The manual override switches 88a–d are connected between the switches 108 and the various electrical components to provide the manual override capability. When the vehicle ignition switch is off, the 12 volt ignition is off and the microprocessor cannot control the system. This prevents draining of the battery if the vehicle is left unattended. The 12 volt ignition is also provided to the microprocessor causing it not to operate the system and assume a standby mode.

Figure 10:
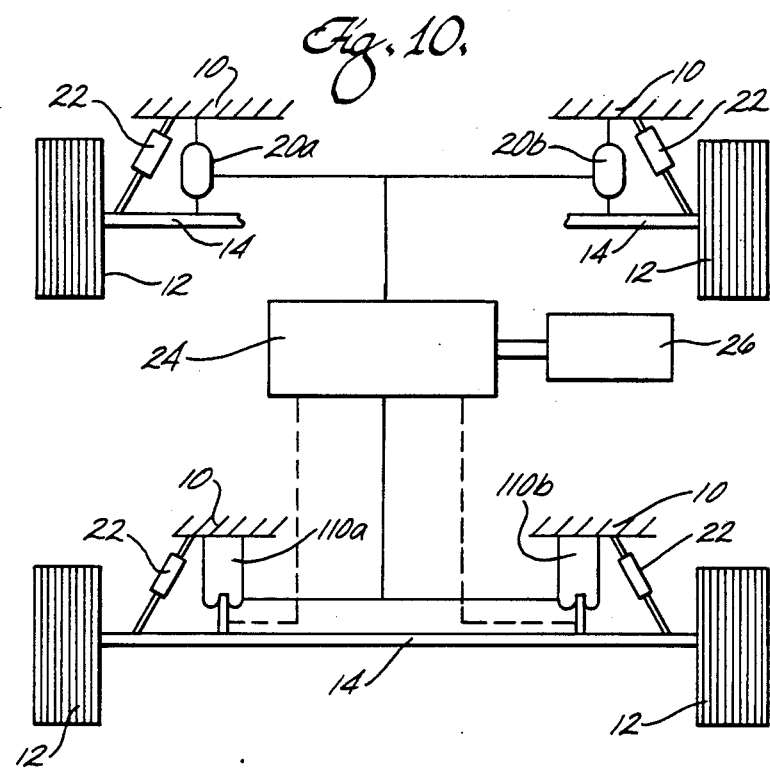
FIG. 10 is a schematic showing the use of bellows-type air springs for the front wheels and rolling lobe type air springs for the rear wheels.
Figure 11:
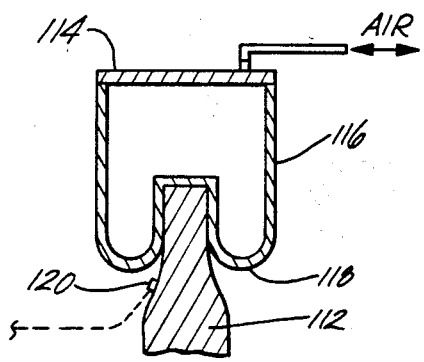
FIG. 11 illustrates a rolling lobe type air spring of the type used for the vehicle schematically illustrated in FIG. 10.

Turning to FIGS. 10 and 11 another vehicle leveling system and method is shown which incorporates the position switch according to the present invention. For the vehicle as shown in FIG. 10 the left front and right front wheels 12, and more particularly the axles 14 or mounting arms, are spaced from the chassis 10 by the bellows-type air springs 20a and 20b as described above. At the rear of the vehicle, the wheels 12 and axle 14 are spaced from the vehicle by rolling lobe-type air springs 110. The rolling lobe-type air springs 110 may be preferred over the bellows-type air spring particularly at the rear of the vehicle in that the rolling lobe-type air springs have preferred spring rate characteristics over the bellows springs. Of course, it is to be understood, as described in detail below, that the leveling system may include rolling lobe air springs at all four wheels. The vehicle also includes shock absorbers 22, control system 24 and a source of compressed air 26.

A rolling lobe-type air spring is schematically shown in FIGS. 12A and 12B. The rolling lobe spring includes a pedestal 112 which is typically connected to the vehicle axle. Connected to the chassis the rolling lobe includes a cap 114 which is attached to the pedestal 112 by an inflatable portion 116. When deflated, the chassis is lowered to rest upon the vehicle axle.

The inflatable portion 116 includes a torroidal lobe 118 which, as the portion 116 is deflated rolls downwardly around a portion of the pedestal 112. When the inflatable portion 116 is inflated with compressed air, the cap 114 moves upwardly unrolling the lobe 118 from the pedestal 112. In that the area acted upon by the pressure within the inflatable portion 116 is constant and is represented by the cap 114, no such relationship exists between height or length of the spring and cross-sectional area as did with the bellows-type springs 20 described above.

The characteristics of a rolling-lobe spring 110 are illustrated by the data depicted in Table II, shown in FIG. 15. As can be appreciated for any particular load and pressure the spring can have various heights.

Because of the characteristics of the rolling lobe springs 110, to level and/or weigh the vehicle means must be provided for sensing the position of the chassis relative to each axle. Traditionally, these sensing means have been embodied as position transducers or proximity switches which generate a signal proportional to the relative position or generate different signals each indicative of a particular relative position or several relative positions between the chassis and axle. It is believed that these position indicators are more expensive and less reliable than the solution embodied in the present invention.

According to the present invention, means are provided, associated with each rolling lobe or, if desired, bellows-type spring, for generating a signal when the chassis and axle are at or nearer than a desired relative position. That is, should the vehicle be loaded, the chassis will sink, the switch means will generate a signal when the chassis is at or below a certain, predetermined height. Further, during operation of the vehicle, should the axle be upwardly displaced by a bump, should loads increase, decrease or shift on the vehicle, or should the chassis dip when rounding a curve, each position switch will generate a signal when the relative position is at or less than a predetermined distance. The signals from the position switches for the various air springs are processed, as described below, for leveling the vehicle. Further, where bellows air springs are used and weighing is desired, the sensor means conveniently issues a signal when the spring is at a predetermined length. Sensing the air spring pressure at this predetermined length can be processed to find the load on the spring. Accordingly, complete deflation of the air spring is not required.

Turning to FIGS. 12A and 12B, a preferred embodiment of the position switch is shown. According to this embodiment, the rolling lobe spring 110 includes the cap 114 adapted to be fastened to the chassis as by bolts 202 and a pedestal 112 which is upstanding from a base plate 206 which is attachable to a suitable bracket by bolts 208 or the like. The bracket is, in turn, attached to the vehicle axle. The inflatable portion 116 or bladder is connected between plate 114 and pedestal 112, the portion 116 including the torroidal lobe 118 which, as the portion 116 is inflated and deflated, rolls upwardly and downwardly along the pedestal 112.

To sense position, each rolling lobe spring 110 includes concealed from the environment within the lobe 116 a contact plate 210 secured to the underside of the cap 114 and spaced therefrom by a layer of electrical insulating material 212. The contact plate 210 may be round, square or the like and has an insulated wire 214 attached to it. Wire 214 passes through a small bore 216 in the cap 114, the bore 216 sealed around the wire 214 by a suitable pressure sealant, screws, O-rings or other suitable sealing technique. Wire 214 is energized from the vehicle electrical system, the wire 214 and thereby the contact plate 210 having a potential of, for example, +12 volts.

To cooperate with the contact plate 212, to generate a position signal, the switch means also includes grounding means secured to the pedestal 112 and positioned within the inflatable portion 116 concealed from the environment. Preferably, these grounding means are embodied as a conductive, conical, coiled spring 218 having a base coil 220 conductively coupled to the pedestal 112, the spring 218 coiling upwardly to an upper coil 222. Pedestal 112 is grounded. In the position as shown in FIG. 12A, the upper coil 222 for the spring 218 is spaced from the contact plate 210 and accordingly, no current passes through wire 214. When the relative position between the chassis and axle changes, as shown in FIG. 12B, which may result from loads or the vehicle encountering bumps, corners, or the like, the upper coil 222 engages the contact plate 210 grounding the plate 210 and wire 214 resulting in a current being generated in wire 214. The coil spring 218 is allowed to collapse upon itself without damage, the suspension having the required stops normally required for the rolling lobe to not compress beyond the required limits. As can be appreciated, by providing the coil spring 118 with a predetermined relaxed, i.e. uncompressed length, the signals represented by a current in wire 214 are generate whenever the relative position between the chassis and wheels is such that the contact plate 210 engages the spring 218 and in all positions wherein the spring 218 is collapsed by the contact plate 210. This relaxed length of the spring 218 should be selected such that when the vehicle is resting on flat ground, and the vehicle chassis leveled, the contact plate 210 for each rolling lobe spring 110 is positioned adjacent to or just contacts the upper coil 222.

With reference to FIGS. 12A, 12B and 13, the operation of a vehicle having rolling lobe air springs 110 at each wheel will now be described.

When the vehicle is loaded, or a load shifts, or other incidents wherein the chassis and axle are displaced relative to each other, the contact plate 210 and spring 218 will occasionally make contact generating a current in wire 214, that current being transformed by suitable means into a signal 226 which is received by the control shown as microprocessor 228. In that the operation of each spring 110 is identical, the description of the microprocessor 228 and its control over the air spring will be described with reference to a single spring 110.

Over a time frame of, for example, five seconds the combined duration of the signals 226 is measured by a duty cycle detector 230 within the microprocessor. That is, during the time interval the contact plate 210 and spring 218 may make several contacts of different durations or one contact may last for the entire lapsed time of the time interval. The microprocessor then compares the combined elapsed duration of the signals 226 during the preselected time interval to establish a duty cycle for the position switch and for the spring 110. Duty cycle can be defined as a percentage expressed by (determined duration of signal 226)/(preselected time interval)×100. That is, for a preselected time interval of five seconds, for example, should the combined duration of the signal 226 be 2.5 second, the detected duty cycle would be fifty per cent.

Based upon the detected duty cycle for the position switch and thereby the spring 110, the microprocessor can determine whether or not the spring 110 must be inflated or deflated. As schematically shown in FIG. 13, should the detected duty cycle fall in the range of 40–60 per cent, the control valve 52 is maintained closed and the rolling lobe spring 110 is neither inflated nor deflated. As stated above, since the relaxed length of the spring 218 is such as to define the desired relative position between the chassis and axle, a detected duty cycle of 40–60 percent establishes that the relative position is substantially as desired. Should the detected duty cycle fall in the range of 25–40 percent, the microprocessor 228 initiates a slow deflate sequence represented by 232 which opens relief valve 48 (FIG. 5) and opens control valve 52 in a pulse or in several pulses of relatively short duration to incrementally deflate the rolling lobe air spring 110 and thereby incrementally lessen the relative distance between the chassis and axle. A detected duty cycle of between 25 and 40 per cent indicates that on average the relative distance between the chassis and axle is greater than desired and accordingly deflation of the lobe spring 120 is required. Should the detected duty cycle fall within the range of 0–25 percent, this indicates that for the preselected time interval the relative position between the chassis and axle is much greater than desired and a greater incremental deflation for the rolling lobe spring 110 is required. For detected duty cycles in this range, the microprocessor 228 initiates a rapid deflate sequence 234 which opens relief vent valve 48 and control valve 52 for a period of time to deflate the rolling lobe air spring 110 in an increment greater than that for the slow deflate sequence. At the end of the preselected duration, the control valve 52 is closed.

Should the detected duty cycle be established to fall within the range of 60–75 percent, this indicates that on average the relative position between the chassis and axle is slightly nearer than desired. Accordingly, in this condition, the microprocessor 228 initiates a slow inflate sequence 236 which closes relief valve 48, opens supply control valve 38 (FIG. 5) and control valve 52 for a short duration of time to incrementally inflate the rolling lobe air spring 110 to incrementally separate the chassis and the axle. At the end of the incremental inflation, the control valve 52 is closed. Should the detected duty cycle fall within the range of 75–100 percent, this establishes that the relative position between the chassis and axle is far nearer than desired and accordingly a greater increment of inflation is required. In this condition, the microprocessor 228 enters the rapid inflate sequence 238 which closes relief valve 48, and opens supply control valve 38 and control valve 52 for an extended duration of time to inflate the rolling lobe spring 110 a greater increment and thereby separate the chassis and axle likewise by a greater increment. Subsequent to such incremental inflation the control valve 52 is closed.

At the end of each preselected time interval and any inflation or deflation, as controlled by the microprocessor 228, a new sensing time interval is initiated by resetting the duty cycle detector 230. As can be appreciated, over one or several time intervals the desired duty cycle of 40–60 percent will be obtained. Further, by following this procedure in sequence for all the rolling lobe springs 110, the vehicle can dynamically be leveled.

If load weighing is desired, the position switches conveniently provide a reference position for the rolling lobe air springs 110. Accordingly, an unloaded weight for the vehicle sprung mass is first established. Under a weigh sequence as initiated at the microprocessor, the air springs are inflated until the contact plate 210 first separates from the grounding spring 218. At this position, the pressure within the inflatable portions 116 for the air springs is sensed, the pressure corresponding to the load borne by each air spring. Accordingly, the weight at each air spring can be obtained. By combining these weights, the unloaded sprung weight of the vehicle can be determined. To determine weight change after a load is added and the air springs are inflated until the contact plates 210 first separate from the grounding springs 218. At this position the pressure within the portions 116 for each air spring is sensed, the pressure corresponding to the load borne by each spring. From this information (change in weight) the weight change for the vehicle sprung mass can be determined.

Turning to FIG. 10, a vehicle is shown wherein rolling lobe air springs 110 are used solely at the rear wheels whereas bellows-type springs 20a and 20b are used at the front wheels. With reference to the preceding description, the operation of the vehicle according to FIG. 10 will now be described.

The bellows-springs 20a and 20b at the front wheels are inflated with a pressure which spaces the chassis 10 the desired distance from the axle 14. Similarly, the rolling lobe springs 110 are likewise inflated to the desired position which may be determined at a point when the position sensor signal is no longer generated or when the desired duty cycle is obtained. The initial inflation may be controlled by appropriate parameters encoded into the first or second microprocessor control ROMS. In this mode the vehicle, usually unloaded, is ready to operate. As the vehicle travels down the road, road bumps and turning of curves, as described above, cause the position switch to generate signals.

When the vehicle is loaded, according to the characteristics of most vehicles, the load is mainly over the rear wheels and upon the rolling-lobe springs 110. Since the pressure within the rolling-lobe springs 110a and 110b is still indicative of the weight or weight change of the vehicle, this weight change can be compared to suitable data encoded into the second ROM 72, the data providing a concordance (i.e., a Table) between the change in pressure and the desired new pressure to be applied to the bellows-springs 20a and 20b. Once this data is retrieved (looked-up) from the second ROM 72, the bellows-springs are provided with compressed air at the pressure determined from the table lookup.

As stated above, the system according to FIG. 10 can also be used simply to determine the weight, and more particularly, the weight change of the vehicle. This feature is important for trucks where it is advantageous to calculate the weight of the load put on or taken off of the truck. Accordingly, the rolling-lobe springs 110a and 110b are pressurized until the vehicle is leveled. The position switches provide for such leveling. This height may be factory selected. Further, the front bellows-springs 20a and 20b are pressurized to the correct pressure corresponding to the level vehicle height. In this state, i.e, the level state, the vehicle is leveled with respect to a datum represented by the ground. The pressure of the gas in the rolling-lobe springs at the level state is, via the data encoded (the data corresponding to Table II) in the second ROM 72 and from the known height, compared to the data to determine the weight on each of the rolling-lobe springs 110a and 110b. Through the known characteristics of the vehicle, which may be represented by an algorithm or the like, the total vehicle unloaded sprung weight $W_u$ may be determined. For example, the vehicle characteristics may be such that a given load, seventy percent of the load is imposed on the rolling-lobe springs whereas the remaining thirty percent of the load is borne by the front bellowssprings. This relationship can be conveniently encoded into a ROM for the control system. Accordingly, the weight on the rolling-lobe springs is divided by 0.70 since seventy percent of the total weight is on the rear springs. This unloaded weight $W_u$ is stored and if desired displayed. Alternatively, only the weight on each of the rear springs is stored. As a further alternative, the unloaded weight of the vehicle may be simply stored in the control system.

The vehicle can then be operated as desired.

When the vehicle is loaded, as stated above, a large portion of the weight is typically distributed over the rear wheels, i.e., on the rolling-lobe springs 110a and 110b. With the known characteristics of the vehicle it can be determined, approximately, what portion of the weight or load is imposed upon the rolling-lobe springs 110a and 110b, the remainder of the load being imposed on the bellows springs 20a and 20b.

Upon loading of the vehicle, the chassis will move downwardly and the supporting springs will be compressed. To determine the weight, the vehicle is again leveled. The control system at the level height senses the pressure via pressure sensor 65. This new sensed pressure is compared to the encoded data of the second ROM 72 (i.e. Table II) and a new weight on the rear springs is calculated. This new weight is processed by the control system, i.e. by applying the vehicle characteristic algorithm, to determine the loaded weight $W_1$ of the vehicle. If desired, this weight can be displayed. Further, by recalling $W_u$ and subtracting it from $W_1$, the weight of the load can be determined. Alternatively, the stored unloaded weight on each spring is compared to the loaded weight to determine the weight of the load on the springs. From the weight distribution algorithm the total weight of the load can be determined.

Once the load weight or weight change is known, the control system supplies pressurized gas to the bellows air springs to properly level the loaded vehicle.

The position switch according to the present invention as described herein is of a simple, inexpensive construction and preferably is safely housed within the air spring away from the environment present at the underside of the vehicle. The foregoing contributes to the reliability of the position sensor.

While we have shown and described certain embodiments of the present invention, it is to be understood that it is subject to many modifications without departing from the spirits of the invention. For example, position switches could be disposed with the bellows-type air springs if for a given vehicle the load is not generally concentrated over the rear wheels.

What is claimed is:

1. A position switch generating a signal when one mass is at or nearer than a preselected position relative to another mass, the switch comprising:
   a collapsible-extensible member having one end secured to one mass and a relaxed length to first contact the other mass when the masses are at the preselected relative positions, said member embodied as a spring having coils of different diameters arranged in a conical configuration such that said spring is collapsible upon itself without coil-to-coil interference;

means for imposing a first electrical potential on said member; and means for imposing a second, different potential upon the other mass, contact of the member with the other mass generating a current signal.

2. The switch of claim 1 wherein the member is grounded.

3. A position switch for an air spring, said switch having a cap coupled to a sprung mass, a base coupled to an unsprung mass and a bladder disposed between the cap and base, said bladder being inflatable to separate the masses and deflatable for collapsing of the masses together, the position switch comprising:

a resilient member having one end attached to one of said base and cap and grounded, said member embodied as a spring having coils of different diameters arranged in a conical configuration such that said spring is collapsible upon itself without coil-to-coil interference;

means for imposing an electrical potential at the other of said base and cap, said member having a relaxed length to position and other end closely adjacent said other of said base and cap when the masses are at a preselected relative position, relative movement between the masses resulting in said member contacting said other of the base and cap to ground the potential and generate a current signal when the masses are closer than the preselected spring.

4. The switch of claim 3 wherein the member is disposed within the bladder between said cap and base.

5. The switch of claim 4 wherein the means for imposing an electrical potential includes a contact disposed within the bladder, means for insulating the contact from ground and a source of electric potential connected to the contact.

6. An air spring for supporting and leveling a sprung mass relative to an unsprung mass comprising:

said air spring includes a base coupled to the unsprung mass, a cap coupled to the sprung mass and an inflatable portion connected between the base and cap, inflation of the portion separating the masses and deflation of the portion permitting the masses to move together;

a grounded, conductive conical coiled spring disposed within the portion and attached to one of said base and cap;

a contact disposed at the other of the base and cap, said spring having a relaxed length to terminate contiguous to the contact when the masses are at a desired relative position;

means for imposing an electrical potential on the contact, engagement between the spring and contact grounding the potential and generating a current signal whenever the masses are nearer than the desired spring; and means for sensing current signal.

* * * * *